United States Patent
Maekawa et al.

(10) Patent No.: US 10,399,518 B2
(45) Date of Patent: Sep. 3, 2019

(54) RELAY DEVICE AND POWER SUPPLY DEVICE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Kosei Maekawa, Mie (JP); Hiromichi Yasunori, Mie (JP); Katsuma Tsukamoto, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 16/061,917

(22) PCT Filed: May 10, 2017

(86) PCT No.: PCT/JP2017/017630
§ 371 (c)(1),
(2) Date: Jun. 13, 2018

(87) PCT Pub. No.: WO2017/208750
PCT Pub. Date: Dec. 7, 2017

(65) Prior Publication Data
US 2018/0361961 A1 Dec. 20, 2018

(30) Foreign Application Priority Data
May 31, 2016 (JP) .................................. 2016-108144

(51) Int. Cl.
*B60R 16/03* (2006.01)
*H01M 10/44* (2006.01)
(Continued)

(52) U.S. Cl.
CPC ............. *B60R 16/03* (2013.01); *H01M 10/44* (2013.01); *H01M 10/48* (2013.01);
(Continued)

(58) Field of Classification Search
CPC ............ H02J 7/34; H02J 7/0021; B60R 16/03
(Continued)

(56) References Cited

U.S. PATENT DOCUMENTS 9,431,850 B2 *  8/2016  Imai ...................... H02J 7/1423
2005/0035656 A1  2/2005  Kuramochi et al.
(Continued)

FOREIGN PATENT DOCUMENTS

JP   H09-107639 A    4/1997
JP   2008-054484 A   3/2008
(Continued)

OTHER PUBLICATIONS

Search Report for PCT/JP2017/017630, dated Jun. 6, 2017.

*Primary Examiner* — Alfonso Perez Borroto
(74) *Attorney, Agent, or Firm* — Honigman LLP

(57) ABSTRACT

Provided are a relay device and a power supply device that can switch on/off a current path between power storage units, and can suppress, if an earth fault has occurred on either power storage unit side, a voltage reduction on the other power storage unit side. A relay device includes: a serial structural portion in which a resistance unit and a switch unit are connected in series to each other; a relay unit that serves as a path for a current to flow between a first power storage unit and a second power storage unit when the switch unit is in the ON state; and a control unit configured (Continued)

to perform control of switching the switch unit of the relay unit.

3 Claims, 5 Drawing Sheets

(51) Int. Cl.
  *H01M 10/48* (2006.01)
  *H02J 7/34* (2006.01)
  *H02J 7/00* (2006.01)
  *H02H 3/08* (2006.01)

(52) U.S. Cl.
  CPC .......... *H02J 7/0021* (2013.01); *H02J 7/0047* (2013.01); *H02J 7/34* (2013.01); *H01M 2220/20* (2013.01); *H02H 3/08* (2013.01)

(58) Field of Classification Search
  USPC .................................................. 307/9.1, 10.1
  See application file for complete search history.

(56) References Cited

U.S. PATENT DOCUMENTS

| 2011/0260544 A1* | 10/2011 | Imai | H02J 7/1423 |
| | | | 307/66 |
| 2014/0239637 A1* | 8/2014 | Sink | F02N 11/0866 |
| | | | 290/31 |
| 2017/0158082 A1* | 6/2017 | Tahara | F02D 17/00 |

FOREIGN PATENT DOCUMENTS

| JP | 2013-247771 A | 12/2013 |
| JP | 2014-086278 A | 5/2014 |
| WO | 2013/115034 A1 | 8/2013 |

\* cited by examiner

RELAY DEVICE AND POWER SUPPLY DEVICE

CROSS-REFERENCE TO RELATED APPLICATIONS

This application is the U.S. national stage of PCT/JP2017/017630 filed May 10, 2017, which claims priority of Japanese Patent Application No. 2016-108144 filed on May 31, 2016, which is incorporated herein by reference in its entirety.

FIELD OF THE INVENTION

The present description relates to a relay device and a power supply device that are associated with a power storage unit.

BACKGROUND OF THE INVENTION

JP 2012-130108A discloses an example of a power supply device to be installed in a vehicle. The power supply device disclosed in Patent Document 1 includes a lead storage battery and a lithium storage battery, the power supply device being provided with an electrical supply line serving as a power path between the lead storage battery and the lithium storage battery. Also, two MOSFETs for switching conduction of the electrical supply line on and off are provided. This power supply device switches the MOSFETs on/off depending on the state of charge (SOC) of the lithium storage battery during, for example, non-regeneration (such as idle operation, acceleration traveling, or steady traveling) so as to perform control such that the SOC is within an optimum range.

SUMMARY OF THE INVENTION

Meanwhile, a system with two power storage units as disclosed in JP 2012-130108A is generally designed so that a resistance value between the two power storage units is as low as possible. For example, in a regenerative two battery system in which regenerative energy is collected and used for the two power storage units, it is necessary to reduce the entire loss in order to effectively collect the regenerative energy, and thus it is preferable to suppress also the resistance value of the electrical path between the power storage units at a lowest possible value. However, in such a case where the resistance value between two power storage units is low, if an earth fault has occurred on either power storage unit side, not only the voltage on the power storage unit side on which the earth fault has occurred but also the voltage on the other power storage unit side are reduced at once, resulting in a period in which no suitable voltage is supplied from any of the power storage units. As a result, there is a halt period in which none of loads connected to the power storage units functions normally.

Furthermore, in such a type of system, a switch is preferably provided between two power storage units to achieve charge control or protection operation. With such a switch, if an earth fault has occurred, for example, on either power storage unit side, the switch can be turned off to interrupt conduction between the two power storage units and thus to separate the system on the other power storage unit side. However, even in this configuration, when an earth fault has occurred on either power storage unit side, the voltage on the other power storage unit side will decrease prior to the switch being turned off, and thus there is the risk that not only, of course, a load on the side on which the earth fault has occurred but also a load connected to the other power storage unit may be disabled.

The present description was made in view of the above-described circumstances, and it is an object thereof to provide a relay device and a power supply device that can switch on/off a current path between power storage units, and can suppress, if an earth fault has occurred on either power storage unit side, a voltage reduction on the other power storage unit side.

According to a first aspect of the present description, a relay device includes: a relay unit that is provided with a switch unit disposed between a first power storage unit and a second power storage unit and in which the switch unit is switched between an ON state in which a current is allowed to flow between the first power storage unit and the second power storage unit, and an OFF state in which no current is allowed to flow; and a control unit configured to turn the switch unit on/off, the relay device further including: a first conductive path electrically connected to the first power storage unit, a first electrical load, and a generator; a second conductive path electrically connected to the second power storage unit and a second electrical load; a first voltage detection unit configured to detect a voltage of the first conductive path; and a second voltage detection unit configured to detect a voltage of the second conductive path, wherein the second electrical load is a load capable of executing a function of the first electrical load if the first electrical load malfunctions, the relay unit has a configuration in which a resistance unit and the switch unit are connected in series to each other between the first conductive path and the second conductive path, and is provided with: a parallel conductive path connected in parallel to the resistance unit; and a second switch unit configured to switch the parallel conductive path between a conductive state and a non-conductive state, the relay unit having a configuration in which, when the switch unit and the second switch unit are both in the ON state, an amount of current flowing through the parallel conductive path is larger than an amount of current flowing through the resistance unit, and the control unit is configured to turn the switch unit and the second switch unit off if a voltage value detected by at least either of the first voltage detection unit and the second voltage detection unit is equal to or smaller than a predetermined abnormality threshold, the control unit is configured to turn the switch unit on and the second switch unit off if a value of the voltage of the second conductive path is equal to or greater than a quick charge start threshold, which is larger than the abnormality threshold, and the control unit is configured to turn the switch unit and the second switch unit on if a value of the voltage of the second conductive path is smaller than the quick charge start threshold and is greater than the abnormality threshold.

According to a second aspect of the present description, a relay device includes: a relay unit that is provided with a switch unit disposed between a first power storage unit and a second power storage unit and in which the switch unit is switched between an ON state in which a current is allowed to flow between the first power storage unit and the second power storage unit, and an OFF state in which no current is allowed to flow; and a control unit configured to turn the switch unit on/off, the relay device further including: a first conductive path electrically connected to the first power storage unit, a first electrical load, and a generator; a second conductive path electrically connected to the second power storage unit and a second electrical load; a first voltage detection unit configured to detect a voltage of the first conductive path; and a second voltage detection unit configured to detect a voltage of the second conductive path, wherein the second electrical load is a load capable of executing a function of the first electrical load if the first electrical load malfunctions, the relay unit is provided with: a serial structural portion in which a resistance unit and the switch unit are connected in series to each other between the first conductive path and the second conductive path; a parallel conductive path connected in parallel to the serial structural portion; and a second switch unit configured to switch the parallel conductive path between a conductive state and a non-conductive state, the relay unit having a configuration in which an amount of current flowing through the parallel conductive path when the second switch unit is in the ON state is larger than an amount of current flowing through the serial structural portion when the switch unit is in the ON state and the second switch unit is in the OFF state, and the control unit is configured to turn the switch unit and the second switch unit off if a voltage value detected by at least either of the first voltage detection unit and the second voltage detection unit is equal to or smaller than a predetermined abnormality threshold, the control unit is configured to turn the switch unit on and the second switch unit off if a value of the voltage of the second conductive path is equal to or greater than a quick charge start threshold, which is larger than the abnormality threshold, and the control unit is configured to turn the switch unit and the second switch unit on if a value of the voltage of the second conductive path is smaller than the quick charge start threshold and is greater than the abnormality threshold.

According to the present description, if an earth fault has occurred on a conductive path on the first power storage unit side with respect to the resistance unit when the switch unit is in the ON state, a voltage reduction on the second power storage unit side can be suppressed due to a resistance component of the resistance unit. Similarly, if an earth fault has occurred on a conductive path on the second power storage unit side with respect to the resistance unit when the switch unit is in the ON state, a voltage reduction on the first power storage unit side can be suppressed due to the resistance component of the resistance unit. In other words, if an earth fault has occurred on either power storage unit side, a voltage reduction on the other power storage unit side can be suppressed, and thus a voltage supplied from the power storage unit other than the side on which the earth fault has occurred is likely to be maintained.

Furthermore, in the description according to the first aspect, when the second switch unit is in the OFF state and the switch unit is in the ON state, it is possible to perform charging with a relatively small amount of current. If, in this case, an earth fault has occurred on either power storage unit side, a voltage reduction on the other power storage unit side can be suppressed, and thus it is possible to place priority on an effect of suppressing a voltage reduction in case of occurrence of an earth fault. Furthermore, when both of the second switch unit and the switch unit are in the ON state, it is possible to perform charging with a relatively large amount of current, making an operation in which priority is placed on the charging speed possible.

In the description according to the second aspect, when the second switch unit is in the OFF state and the switch unit is in the ON state, it is possible to perform charging with a relatively small amount of current. If, in this case, an earth fault has occurred on either power storage unit side, a voltage reduction on the other power storage unit side can be suppressed, and thus it is possible to place priority on the effect of suppressing a voltage reduction in case of occurrence of an earth fault. Furthermore, when the second switch unit is in the ON state, it is possible to perform charging with a relatively large amount of current, making an operation in which priority is placed on the charging speed possible. Particularly in this configuration, since it is possible to cause a relatively small current to flow through the switch unit and a relatively large current to flow through the second switch unit, the switch unit is required to have characteristics less strict than the second switch unit. Accordingly, it is easy to achieve size and cost reduction of the switch unit.

BRIEF DESCRIPTION OF THE DRAWINGS

Brief Description of Drawings

Figure 1:
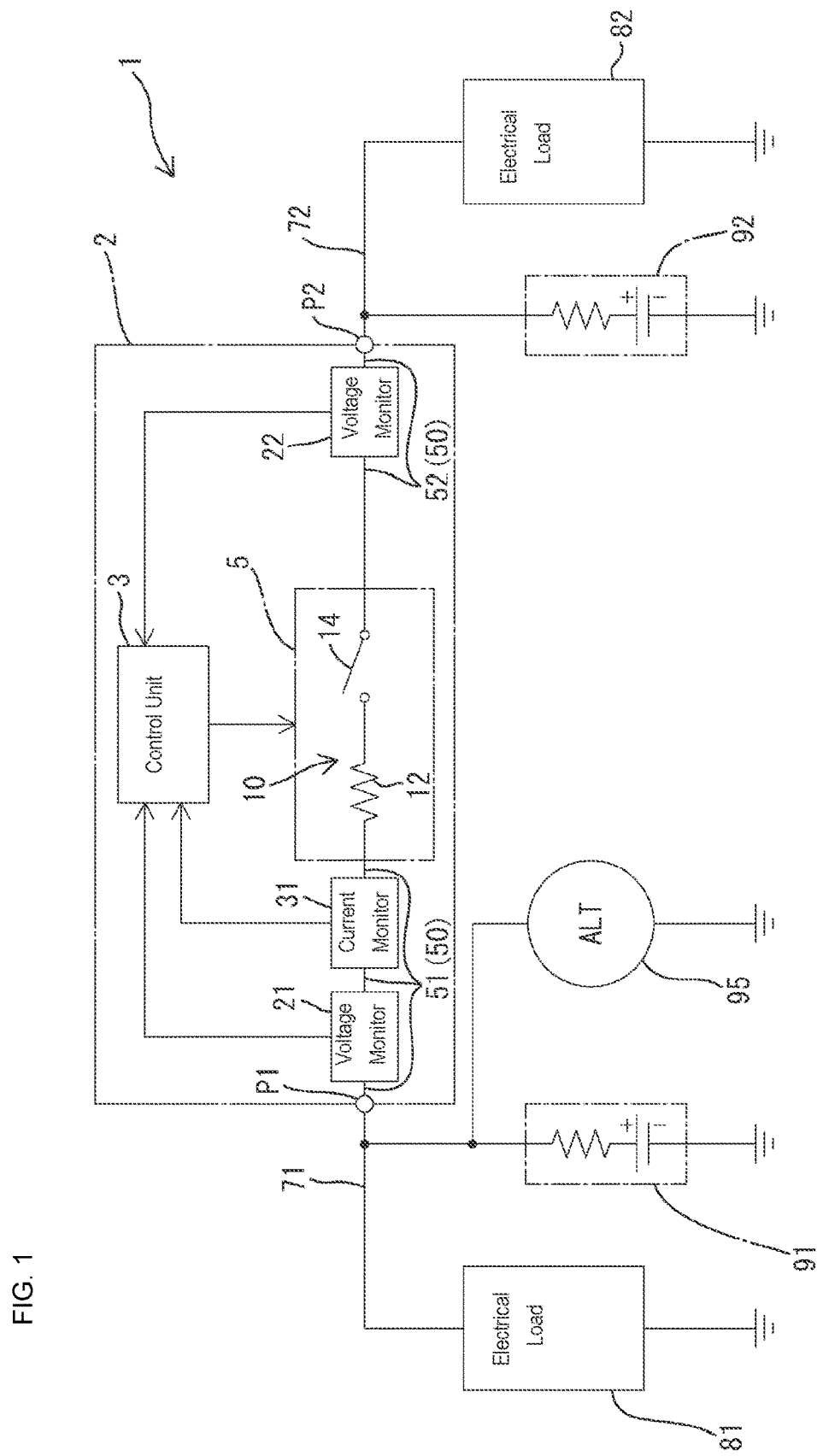

FIG. 1 is a circuit diagram schematically illustrating examples of a relay device and an on-board power supply device according to Embodiment 1.

Figure 2:
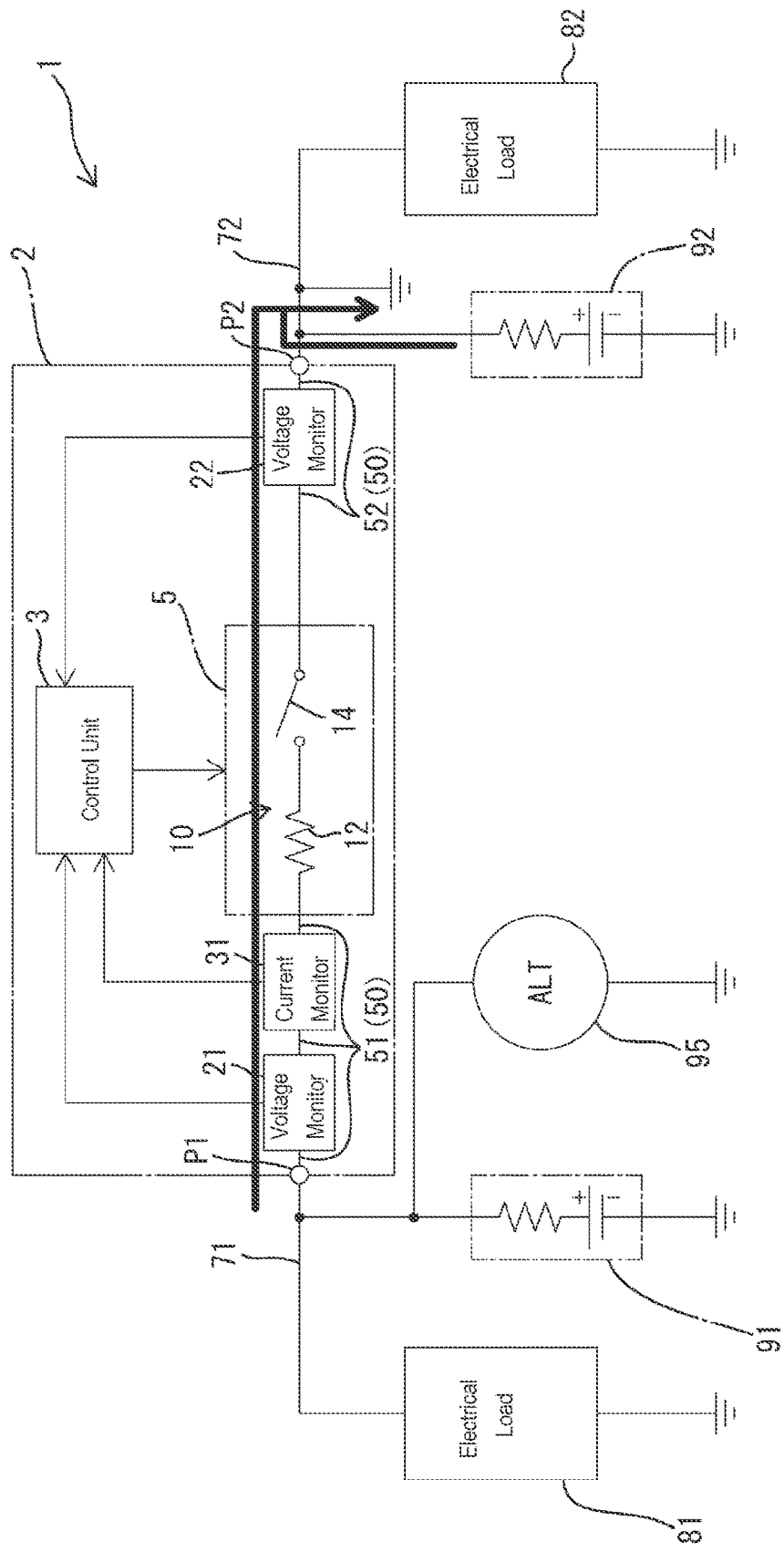

FIG. 2 is a diagram illustrating a case where, in the on-board power supply device of FIG. 1, an earth fault has occurred in a wiring on a second power storage unit side.

Figure 3:
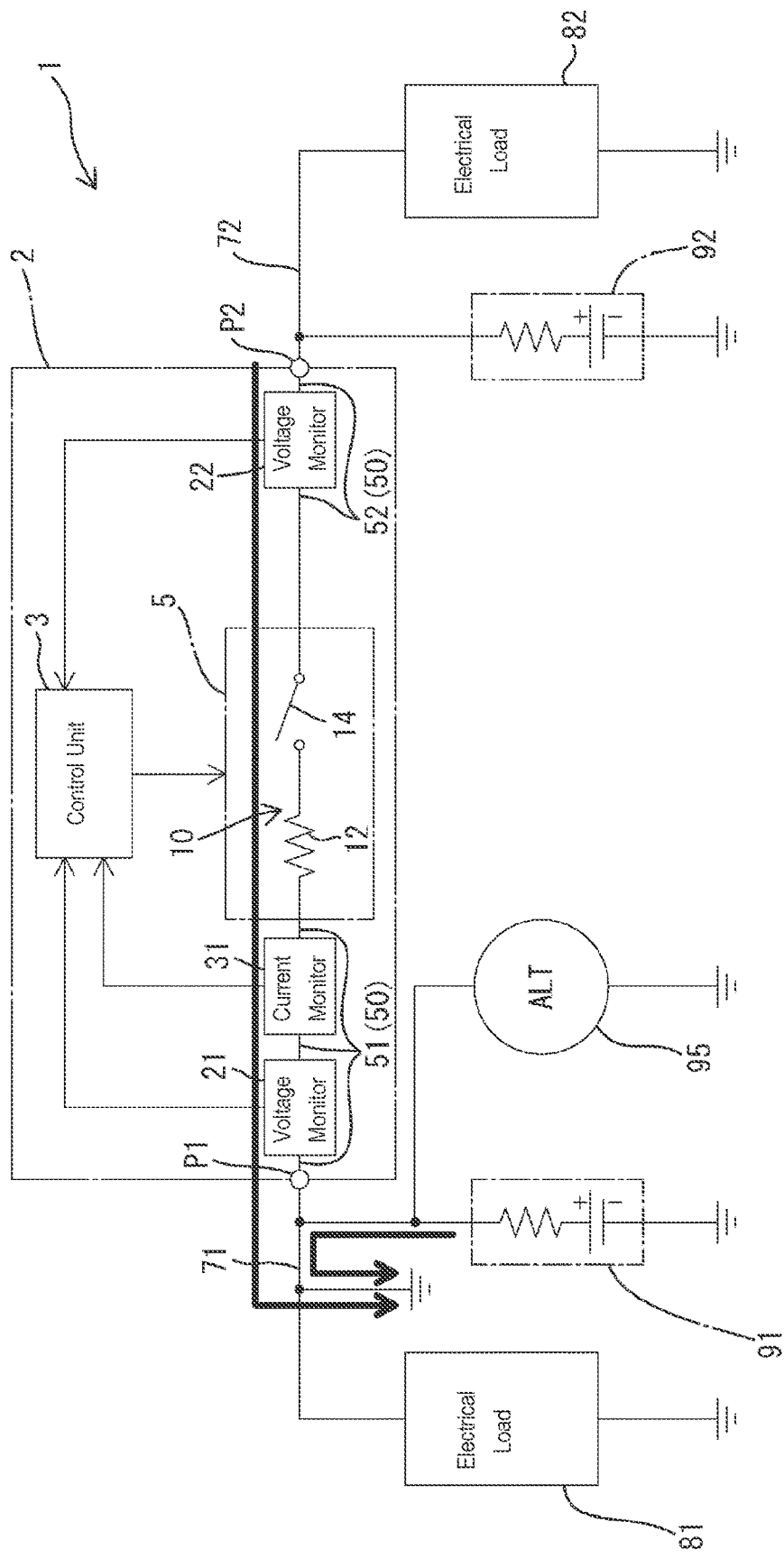

FIG. 3 is a diagram illustrating a case where, in the on-board power supply device of FIG. 1, an earth fault has occurred in a wiring on a first power storage unit side.

Figure 4:
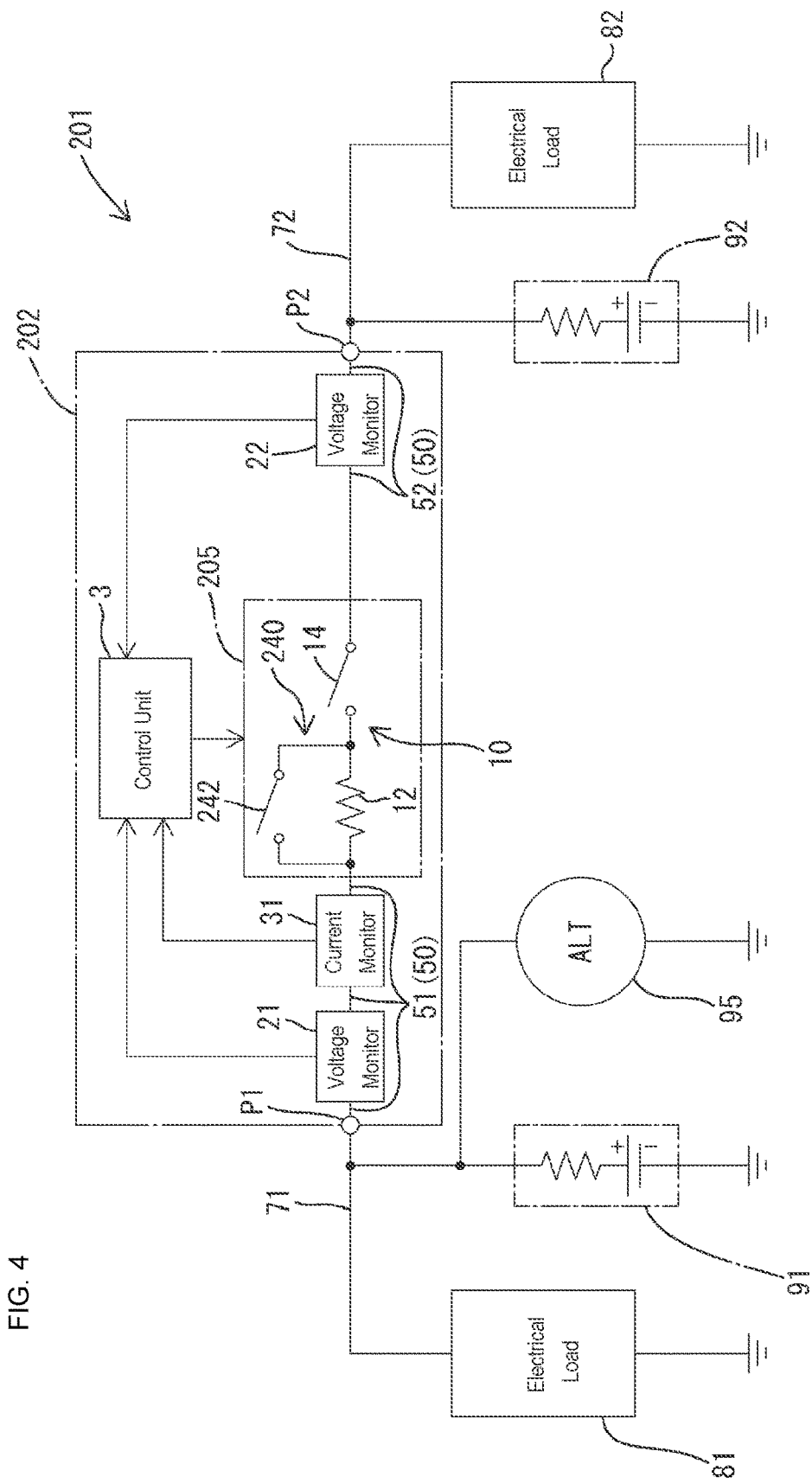

FIG. 4 is a circuit diagram schematically illustrating examples of a relay device and an on-board power supply device according to Embodiment 2.

Figure 5:
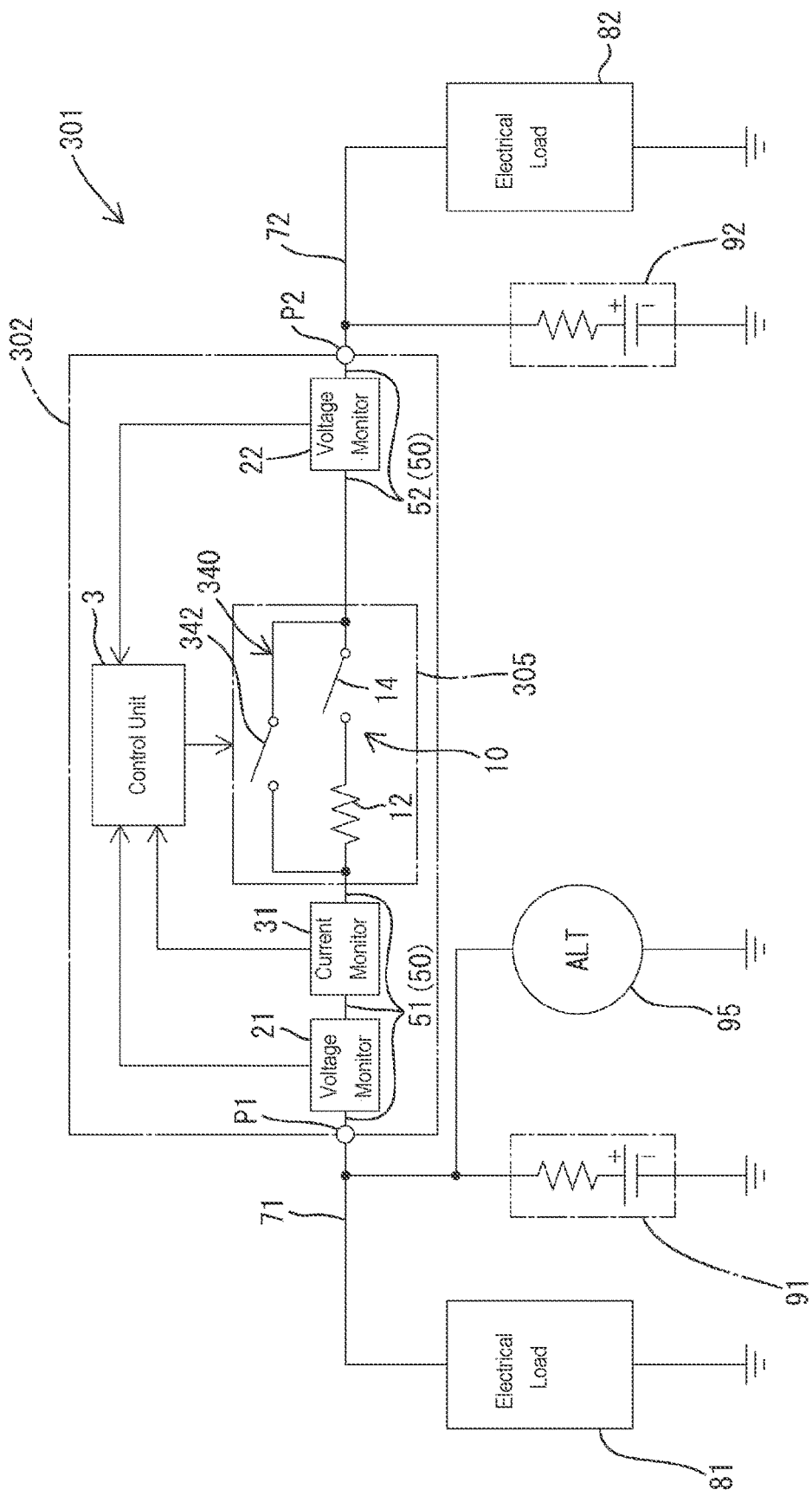

FIG. 5 is a circuit diagram schematically illustrating examples of a relay device and an on-board power supply device according to Embodiment 3.

DETAILED DESCRIPTION OF THE PREFERRED EMBODIMENTS

A power supply device may be provided that includes: the relay device with any one of the above-described configurations; and the second power storage unit electrically connected to one end of the relay device.

According to this configuration, a power supply device that has the same effect as that of the above-described relay device can be realized.

Embodiment 1

The following will describe Embodiment 1 in which the present description is embodied. An on-board power supply device 1 (hereinafter, also referred to simply as "power supply device 1") shown in FIG. 1 is configured as a power supply system to be installed in a vehicle that is provided with a first power storage unit 91 and a second power storage unit 92. A relay device 2 is part of the on-board power supply device 1, and has a function of switching conduction between the first power storage unit 91 and the second power storage unit 92 on and off.

Hereinafter, a description will be given taking, as a representative example for the on-board power supply device 1, a configuration that includes a first electrical load 81, which is a main load, and a second electrical load 82, which is an auxiliary load, the first electrical load 81 and the second electrical load 82 having the same function. Note however that this configuration is merely a representative example, and the application of the relay device 2 is not limited to this configuration.

The first electrical load 81, which serves as a main load, is a motorized power steering system for example, and is configured to be supplied with power from the first power storage unit 91 so that an electric component such as a motor operates. The second electrical load 82, which serves as a sub load, is a motorized power steering system that has the same configuration and function as the first electrical load 81. The on-board power supply device 1 is configured as a system in which, if the first electrical load 81 malfunctions, the second electrical load 82 operates in place of the first electrical load 81, making it possible to maintain the function of the first electrical load 81 even if the first electrical load 81 malfunctions.

The first power storage unit 91 is a power supply unit that can supply power to the first electrical load 81, and is made of a well-known power source such as a lead battery, for example. The second power storage unit 92 is a power supply unit that can supply power to the second electrical load 82, and is made of a well-known power source such as a lithium-ion battery or an electric double layer capacitor, for example.

The first power storage unit 91 and the first electrical load 81 are electrically connected to a wiring 71 provided on the outside of the relay device 2, and a generator 95 is also electrically connected to the wiring 71. The generator 95 is configured as a well-known alternator, and is configured to apply a power generation voltage to the wiring 71. The wiring 71 is made of, for example, a wire or the like, and is electrically connected to a first conductive path 51, which will be described later.

The second power storage unit 92 and the second electrical load 82 are electrically connected to a wiring 72 provided on the outside of the relay device 2. The wiring 72 is made of, for example, a wire or the like, and is electrically connected to a second conductive path 52, which will be described later, and is electrically connected to one end of the relay device 2 via the second conductive path 52.

The first power storage unit 91 is charged with power generated by the generator 95. When a relay unit 5 is in the ON state (a state in which a current can flow therethrough), the second power storage unit 92 is charged with the power generated by the generator 95 or power from the first power storage unit 91.

The relay device 2 is provided with the first conductive path 51, the second conductive path 52, the relay unit 5, a first voltage detection unit 21, a first current detection unit 31, a second voltage detection unit 22, and a control unit 3. Note that, in the example of FIG. 1, the relay device 2 is configured as a circuit board with various types of electronic components mounted on the board body, the relay device 2 being connected to the wiring 71 via a terminal P1 and being connected to the wiring 72 via a terminal P2.

A conductive path 50 is a portion serving as a path for a current that flows between the first power storage unit 91 and the second power storage unit 92. The conductive path 50 includes: the first conductive path 51 arranged on the first power storage unit 91 side with respect to a serial structural portion 10; and the second conductive path 52 arranged on the second power storage unit 92 side with respect to the serial structural portion 10. The conductive path 50 is a power line, and serves as a current path through which a current is caused to flow from the first power storage unit 91 and the generator 95 to the second power storage unit 92. Furthermore, in some cases, the conductive path 50 may serve as a path through which a discharge current is caused to flow from the second power storage unit 92 to the wiring 71 side.

The first conductive path 51 is connected, on one side, to an end of a resistance unit 12 and is connected, on the other side, to the wiring 71 on the first power storage unit 91 side, so that the first conductive path 51 is electrically connected to the first power storage unit 91 via the wiring 71. The second conductive path 52 is connected to the wiring 72 on the second power storage unit 92 side, and is electrically connected to the second power storage unit 92 via the wiring 72. Note that a first current detection unit 31, which will be described later, is disposed on the first conductive path 51.

The relay unit 5 includes the serial structural portion 10 in which the resistance unit 12 and a switch unit 14 are connected in series, and is disposed between the first conductive path 51 and the second conductive path 52. The relay unit 5 brings the first power storage unit 91 and the second power storage unit 92 into conduction when the switch unit 14 is in the ON state, and in this case, a path is created for a current to flow between the first power storage unit 91 and the second power storage unit 92. Specifically, the configuration is such that all currents that flow through the relay unit 5 when the switch unit 14 is in the ON state pass through the resistance unit 12. Furthermore, the relay unit 5 is configured to interrupt a current flow between the first power storage unit 91 and the second power storage unit 92 when the switch unit 14 is in the OFF state, and during the OFF state, both a current that flows from the first conductive path 51 side to the second conductive path 52 side, and a current that flows from the second conductive path 52 side to the first conductive path 51 side are interrupted.

The switch unit 14 is made of, for example, two MOSFETs that are connected in series to each other while being directed in different directions. Hereinafter, a description will be given taking a case where the switch unit 14 is made of two N-channel MOSFETs as a representative example. If the switch unit 14 is made of two N-channel MOSFETs, the two MOSFETs can be provided in series in a so-called back-to-back state (state in which body diodes are arranged while being directed opposite to each other), as a result of an arrangement in which, for example, drains of these MOSFETs are connected to each other, a source of one of the MOSFETs is connected to an end of the resistance unit 12, and a source of the other one of the MOSFETs is connected to the second conductive path 52. In this case, when the control unit 3 supplies ON signals to gates of the two MOSFETs, the switch unit 14 is turned on to realize a conductive state. Furthermore, when the control unit 3 supplies OFF signals to the gates of the two MOSFETs, the switch unit 14 is turned off to realize a non-conductive state. In the non-conductive state, the switch unit 14 does not cause a current to flow in either direction, and in this state, a current flow between the first conductive path 51 and the second conductive path 52 is completely interrupted.

The first voltage detection unit 21 is configured as a well-known voltage detection circuit (voltage monitor) and has a function of detecting a voltage at the first conductive path 51. The value of the voltage detected by the first voltage detection unit 21 is input to the control unit 3 via a signal line.

The second voltage detection unit 22 is configured as a well-known voltage detection circuit (voltage monitor) and has a function of detecting a voltage at the second conductive path 52. The value of the voltage detected by the second voltage detection unit 22 is input to the control unit 3 via a signal line.

The first current detection unit 31 is configured as a well-known current detection circuit (current monitor) and has a function of detecting a current flowing through the first conductive path 51. The value of the current detected by the first current detection unit 31 is input to the control unit 3 via a signal line.

The control unit 3 includes, for example, a microcomputer provided with a CPU, a ROM, a RAM, an A/D converter, and the like. A value detected by the first voltage detection unit 21 (voltage value of the first conductive path 51), a value detected by the second voltage detection unit 22 (voltage value of the second conductive path 52), and a value detected by the first current detection unit 31 (current value of the first conductive path 51) are input to the control unit 3. The detected values input to the control unit 3 are converted into digital values by the A/D converter of the control unit 3.

Here, a basic operation of the relay device 2 in a normal state will be described. In the relay device 2, the control unit 3 turns the switch unit 14 on/off. If a predetermined ON condition is met, the control unit 3 turns on the switch unit 14. When the switch unit 14 is turned on in this way, the first power storage unit 91 and the second power storage unit 92 are conductively connected. The timing at which the control unit 3 turns on the switch unit 14 is not particularly limited, and the number of conditions is also not limited to one. For example, the control unit 3 may be configured to continuously monitor voltages output from the second power storage unit 92, and to turn on the switch unit 14 if the voltage output from the second power storage unit 92 has reached a predetermined first threshold (full charge threshold) and then has decreased to a value lower than a predetermined second threshold (charge start threshold). In other words, the control unit 3 may perform control such that if, after full charge, the voltage output from the second power storage unit 92 decreases to a value lower than the charge start threshold, the control unit 3 switches the conductive path 50 to the conductive state so that the second power storage unit 92 is charged with power from the generator 95 or the first power storage unit 91. Of course, the switch unit 14 may also be turned on at another timing.

Furthermore, control unit 3 turns off the switch unit 14 if a predetermined condition is met. The condition under which the control unit 3 turns off the switch unit 14 is not particularly limited, and the number of conditions is also not limited to one. For example, the control unit 3 may also be configured to turn off the switch unit 14 if the voltage output from the second power storage unit 92 has reached the predetermined first threshold (full charge threshold) (that is, when the second power storage unit 92 has been sufficiently charged). Alternatively, the control unit 3 may also be configured to turn off the switch unit 14 if the power supply device 1 is in a predetermined abnormal state. Of course, switch unit 14 may also be turned off at another timing.

The following will describe an operation of the relay device 2 in an abnormal state. If a predetermined abnormal state has occurred, the control unit 3 forcibly turns off the switch unit 14 provided in the relay unit 5. For example, the control unit 3 continuously monitors detected values (voltage values) input from the first voltage detection unit 21 and the second voltage detection unit 22, and turns off the switch unit 14 if the detected value input from at least either of the first voltage detection unit 21 and the second voltage detection unit 22 is a predetermined abnormality threshold Vth or less. Note that the value of the abnormality threshold Vth is not particularly limited but can be set to a value lower than the above-described second threshold, for example.

The following will describe an example of the operation performed when an abnormality has occurred. If, as shown in FIG. 2, an earth fault has occurred in the wiring 72 connected to the second power storage unit 92 when the switch unit 14 of the relay unit 5 is in the ON state, the voltage values at the wiring 72 and the second conductive path 52 instantaneously change to values close to 0V (ground potential), and a current flows into the portion in which the earth fault has occurred, as shown in FIG. 2. Note however that the relay device 2 is provided with the resistance unit 12 connected in series to the switch unit 14, and a current will flow from the first conductive path 51 side to the second conductive path 52 side via the resistance unit 12. In other words, in such a case where an earth fault has occurred, due to a resistance component of the resistance unit 12, the voltage at the conductive path (that is, the first conductive path 51) arranged on the side opposite to the side on which the earth fault has occurred with the resistance unit 12 interposed therebetween is significantly suppressed without decreasing to a value close to 0V. Furthermore, in such a case where an earth fault has occurred as shown in FIG. 2, the voltage value detected by the second voltage detection unit 22 instantaneously decreases to a value lower than the abnormality threshold Vth immediately after the occurrence of the earth fault, and thus the control unit 3 can instantaneously detect that an abnormality has occurred immediately after the earth fault has occurred. Also, the control unit 3 can immediately turn the switch unit 14 off, and can promptly interrupt the current flow through the conductive path 50.

Accordingly, if an earth fault has occurred on the second conductive path 52 side, a voltage reduction on the first conductive path 51 side can be suppressed by the resistance component of the resistance unit 12, and thus it is possible to promptly interrupt the switch unit 14 while suppressing the voltage reduction. This makes it possible to further reduce the likelihood that a voltage supplied to a load connected to the first conductive path 51 decreases to a value lower than a required voltage.

Such functions and effects are also achieved when, as shown in FIG. 3, an earth fault has occurred on the first power storage unit 91 side. If, as shown in FIG. 3, an earth fault has occurred in the wiring 71 connected to the first power storage unit 91, the voltage values at the wiring 71 and the first conductive path 51 instantaneously change to values close to 0V (ground potential), and a current flows into the portion in which the earth fault has occurred, as shown in FIG. 3. Note however that the relay device 2 is provided with the resistance unit 12 connected in series to the switch unit 14, and a current will flow from the second conductive path 52 side to the first conductive path 51 side via the resistance unit 12. In other words, in such a case where an earth fault has occurred, due to a resistance component of the resistance unit 12, the voltage of the conductive path (that is, the second conductive path 52) arranged on the side opposite to the side on which the earth fault has occurred with the resistance unit 12 interposed therebetween is significantly suppressed without decreasing to a value close to 0V. Furthermore, in such a case where an earth fault has occurred as shown in FIG. 3, the voltage value detected by the first voltage detection unit 21 instantaneously decreases to a value lower than the abnormality threshold Vth immediately after the occurrence of the earth fault, and thus the control unit 3 can instantaneously detect that an abnormality has occurred immediately after the earth fault has occurred. Also, the control unit 3 can immediately turn the switch unit 14 off, and can promptly interrupt the current flow through the conductive path 50.

Accordingly, if an earth fault has occurred on the first conductive path 51 side, a voltage reduction on the second conductive path 52 side can be suppressed by the resistance component of the resistance unit 12, and thus it is possible to promptly interrupt the switch unit 14 while suppressing the voltage reduction. This makes it possible to further reduce the likelihood that a voltage supplied to a load connected to the second conductive path 52 decreases to a value lower than a required voltage.

Note that, in the above-described configuration, an example is shown in which the control unit 3 turns the switch unit 14 off if the value detected by the first voltage detection unit 21 or the second voltage detection unit 22 is in an abnormal range during the ON operation of the switch unit 14, but the present description is not limited to this example. In addition to or in place of the above-described control, the control unit 3 may also turn the switch unit 14 off if the value detected by the first current detection unit 31 is in an abnormal range (for example, if the value is larger than a predetermined overcurrent threshold) during the ON operation of the switch unit 14.

In the present configuration, the first voltage detection unit 21, the second voltage detection unit 22, and the first current detection unit 31 correspond to an example of a detection unit, and have a function of detecting at least either of a current and a voltage of at least either of the first conductive path 51, which is arranged between one end of the resistance unit 12 and the first power storage unit 91, and the second conductive path 52, which is arranged between the other end of the resistance unit 12 and the second power storage unit 92. Also, the control unit 3 has a function of performing control of switching the switch unit 14, and specifically, the control unit 3 is configured to turn the switch unit 14 off if the value detected by the detection unit is in a predetermined abnormal range corresponding to the earth fault state when at least the switch unit 14 is in the ON state.

For example, if the first voltage detection unit 21 and the second voltage detection unit 22 function as the detection units, the predetermined abnormal range refers to a range up to the abnormality threshold Vth, and in this configuration, the control unit 3 turns the switch unit 14 off if a value (voltage value) detected by at least either of the first voltage detection unit 21 and the second voltage detection unit 22 is in a predetermined abnormal range (within a range up to the abnormality threshold Vth) when the switch unit 14 is in the ON state. Alternatively, if the first current detection unit 31 functions as the detection unit, the predetermined abnormal range refers to a range above an abnormality threshold Ith, and in this configuration, the control unit 3 turns the switch unit 14 off if a value (current value) detected by the first current detection unit 31 is in the predetermined abnormal range (within a range above the abnormality threshold Ith) when the switch unit 14 is in the ON state.

As described above, if, as shown in FIG. 3, an earth fault has occurred on the conductive path on the first power storage unit 91 side with respect to the resistance unit 12 when the switch unit 14 is in the ON state, the relay device 2 of the present configuration can suppress a voltage reduction on the second power storage unit 92 side using a resistance component of the resistance unit 12. Similarly, if, as shown in FIG. 2, an earth fault has occurred on the conductive path on the second power storage unit 92 side with respect to the resistance unit 12 when the switch unit 14 is in the ON state, it is possible to suppress a voltage reduction on the first power storage unit 91 side using the resistance component of the resistance unit 12. In other words, if an earth fault has occurred on either power storage unit side, a voltage reduction on the other power storage unit side can be suppressed, and thus a voltage supplied from the power storage unit other than the side on which the earth fault has occurred is likely to be maintained.

The relay device 2 of the present configuration has a configuration in which all currents that flow through the relay unit 5 when the switch unit 14 is in the ON state pass through the resistance unit 12. In this configuration, if a current is caused to flow between the power storage units due to the ON operation of the relay device 2, a current will always flow through the resistance unit 12, and if an earth fault occurs on either power storage unit side while the current is flowing between the power storage units, the resistance unit 12 does not fail to be present between the portion in which the earth fault has occurred and the other power storage unit. Accordingly, it is possible to reliably suppress a voltage reduction on the other power storage unit side using the resistance unit 12.

The relay device 2 of the present configuration includes the detection unit, and the detection unit is configured to detect at least either of a current or a voltage of at least either of the first conductive path 51, which is arranged between one end of the resistance unit 12 and the first power storage unit 91, and the second conductive path 52, which is arranged between the other end of the resistance unit 12 and the second power storage unit 92. The control unit 3 is configured to turn the switch unit 14 off if the value detected by the detection unit is in a predetermined abnormal range corresponding to the earth fault state when at least the switch unit 14 is in the ON state. According to this configuration, if an earth fault has occurred on the first conductive path 51 or the second conductive path 52, or a conductive path electrically connected to them, it is possible to detect a change in current or voltage caused due to the earth fault, and to turn the switch unit 14 off. Specifically, due to the presence of the resistance unit 12, it is possible to suppress, during the period from the occurrence of the earth fault until the switch unit 14 is turned off, a voltage reduction on the side on which no earth fault has occurred, and thus a required voltage on the side on which no earth fault has occurred is likely to be maintained.

Embodiment 2

The following will describe a relay device 202 according to Embodiment 2 and an on-board power supply device 201 using it with reference to FIG. 4. The on-board power supply device 201 shown in FIG. 4 differs from the on-board power supply device 1 of Embodiment 1 only in the configuration of the relay device 202 and the method for controlling the relay device 202, and is otherwise the same as the on-board power supply device 1 of Embodiment 1. Accordingly, in FIG. 4, the same reference numerals as those of the on-board power supply device 1 of Embodiment 1 shown in FIG. 1 and the like are given to the same components as those of the on-board power supply device 1, and detailed descriptions of the same components will be omitted in the following description.

The relay device 202 shown in FIG. 4 is provided with a relay unit 205 and a control unit 3. The control unit 3 has the same circuit configuration as that of the control unit 3 of the relay device 2 of Embodiment 1, and only the method for controlling the relay unit 205 differs from that of the control unit 3 of Embodiment 1.

The relay unit 205 is a portion that serves as a path for a current to flow between the first power storage unit 91 and the second power storage unit 92 when the switch unit 14 is in the ON state. A serial structural portion 10 provided in the relay unit 205 has the same configuration as the serial structural portion 10 of Embodiment 1, and includes the resistance unit 12 and the switch unit 14 that are connected in series to each other between the first conductive path 51 and the second conductive path 52.

The relay unit 205 is provided with a parallel conductive path 240 connected in parallel to the resistance unit 12, and a second switch unit 242 configured to switch the parallel conductive path 240 between the conductive state and the non-conductive state. The second switch unit 242 is made of, for example, the same switching means as that of the switch unit 14, and is configured to short the path between both ends of the resistance unit 12 during the ON state, but not to cause a current to flow through the parallel conductive path 240 during the OFF state. The relay unit 205 has a configuration in which currents flow through the path of the resistance unit 12 and the path of the parallel conductive path 240 when the switch unit 14 and the second switch unit 242 are both in the ON state, and the amount of current flowing through the parallel conductive path 240 is significantly larger than the amount of current flowing through the resistance unit 12.

Here, control in a normal state will be described. In the relay device 202, the control unit 3 turns the switch unit 14 and the second switch unit 242 on/off. If a predetermined first condition is met, the control unit 3 turns on only the switch unit 14 and not the second switch unit 242. For example, the control unit 3 may be configured to continuously monitor voltages output from the second power storage unit 92, and turn on only the switch unit 14 if the voltage output from the second power storage unit 92 is less than a predetermined second threshold (charge start threshold) and is equal to or greater than a third threshold (quick charge start threshold). Specific examples include a case where only the switch unit 14 is turned on if the voltage output from the second power storage unit 92 has reached a predetermined first threshold (full charge threshold) and then has decreased to a value lower than the predetermined second threshold (charge start threshold), and a charge current is caused to flow through the serial structural portion 10 based on the power of the generator 95 or the first power storage unit 91 to charge the second power storage unit 92. According to this example, when the second power storage unit 92 has been fully charged, and then the voltage output from the second power storage unit 92 has decreased to a value lower than the predetermined second threshold (charge start threshold) due to driving of an electrical load for example, it is possible to perform recharging with a relatively small charge current. Note that this case is merely an example, and the timing at which the control unit 3 turns on only the switch unit 14 (timing at which the first condition is met) is not particularly limited, and the number of conditions is also not limited to one.

If the predetermined second condition is met, the control unit 3 turns on both of the switch unit 14 and the second switch unit 242. For example, the control unit 3 may also perform control such that both of the switch unit 14 and the second switch unit 242 are turned on if the voltage output from the second power storage unit 92 is less than the above-described third threshold (quick charge start threshold) and is larger than a later-described abnormality threshold. Specific examples include a case where, if the voltage output from the second power storage unit 92 is less than the third threshold (quick charge start threshold) and is larger than the abnormality threshold during a particular period such as a period immediately after the ignition switch of the vehicle has been switched from the OFF state to the ON state, the control unit 3 may turn on the switch unit 14 and the second switch unit, and a charge current is caused to flow through the serial structural portion 10 and the parallel conductive path 240 based on the power of the generator 95 or the first power storage unit 91 so that the second power storage unit 92 is quickly charged. According to this example, when the voltage output from the second power storage unit 92 has decreased largely by a certain degree during the particular period, it is possible to perform recharging with a relatively large charge current. Note that this case is merely an example, and the timing at which the control unit 3 turns on the switch unit 14 and the second switch unit 242 (timing at which the second condition is met) is not particularly limited, and the number of conditions is also not limited to one.

Furthermore, if the predetermined condition is met, the control unit 3 turns off the switch unit 14 and the second switch unit 242. The conditions under which the control unit 3 turns off the switch unit 14 and the second switch unit 242 are not particularly limited, and the number of conditions is also not limited to one. For example, the control unit 3 may also be configured to turn off both of the switch unit 14 and the second switch unit 242 if the voltage output from the second power storage unit 92 has reached the predetermined first threshold (full charge threshold) (that is, if the second power storage unit 92 is fully charged). Alternatively, the control unit 3 may also be configured to turn off the switch unit 14 and the second switch unit 242 if the power supply device 201 is in the predetermined abnormal state. Of course, the switch unit 14 and the second switch unit 242 may also be turned off at another timing.

The following will describe an operation of the relay device 202 when an abnormality has occurred. If a predetermined abnormal state has occurred, the control unit 3 forcibly turns off the switch unit 14 and the second switch unit 242 provided in the relay unit 5. For example, the control unit 3 continuously monitors detected values (voltage values) input from a first voltage detection unit 21 and a second voltage detection unit 22, which correspond to an example of the detection unit, and turns off both of the switch unit 14 and the second switch unit 242 if the detected value input from at least either of the first voltage detection unit 21 and the second voltage detection unit 22 is the predetermined abnormality threshold Vth or less. Note that the value of the abnormality threshold Vth is not particularly limited, but can be set to, for example, a value lower than the above-described second and third thresholds.

Note that, also in this example, a first current detection unit 31 may function as the detection unit, and in this case, the control unit 3 turns off both of the switch unit 14 and the second switch unit 242 if the value (current value) detected by the first current detection unit 31 is within the predetermined abnormal range (within a range above the abnormality threshold Ith) when at least switch unit 14 is in the ON state.

As described above, in the relay device 202 and the power supply device 201 using it, the relay unit 5 is provided with the parallel conductive path 240 connected in parallel to the resistance unit 12, and the second switch unit 242 configured to switch the parallel conductive path 240 between the conductive state and the non-conductive state. Also, the configuration is such that, when the second switch unit 242 is in the ON state, the amount of current flowing through the parallel conductive path 240 is larger than the amount of current flowing through the resistance unit 12. Also, the control unit 3 functions to perform control of switching the switch unit 14 and the second switch unit 242.

In this configuration, it is possible to perform charging with a relatively small amount of current if the second switch unit 242 is in the OFF state and the switch unit 14 is in the ON state. If, in this case, an earth fault has occurred on either power storage unit side, a voltage reduction on the other power storage unit side can be suppressed, and thus it is possible to place priority on an effect of suppressing a voltage reduction in case of occurrence of an earth fault. In other words, when performing charging such that the switch unit 14 is in the ON state and the second switch unit 242 is in the OFF state, the same functions and effects as in Embodiment 1 can be achieved when an earth fault has occurred.

Furthermore, when the second switch unit 242 and the switch unit 14 are both in the ON state, it is possible to perform charging with a relatively large amount of current, making an operation in which in which priority is placed on the charging speed possible.

The control unit 3 is configured to turn on only the switch unit 14 and not the second switch unit 242 if the first condition is met, and turn both of the switch unit 14 and the second switch unit 242 on if the second condition is met. According to this configuration, it is possible to control the usage such that priority is placed on the effect of suppressing a voltage reduction in case of occurrence of an earth fault if the predetermined first condition is met, and priority is placed on the charging speed if the predetermined second condition is met.

Embodiment 3

The following will describe a relay device 302 according to Embodiment 3 and an on-board power supply device 301 using it with reference to FIG. 5. The on-board power supply device 301 shown in FIG. 5 differs from the on-board power supply device 1 of Embodiment 1 only in the configuration of the relay device 302 and the method for controlling the relay device 302, and is otherwise the same as the on-board power supply device 1 of Embodiment 1. Accordingly, in FIG. 5, the same reference numerals as those of the on-board power supply device 1 of Embodiment 1 shown in FIG. 1 and the like are given to the same components as those of the on-board power supply device 1, and detailed descriptions of the same components will be omitted in the following description.

The relay device 302 shown in FIG. 5 is provided with a relay unit 305 and a control unit 3. The control unit 3 has the same circuit configuration as that of the control unit 3 of the relay device 2 of Embodiment 1, and only the method for controlling the relay unit 305 differs from that of the control unit 3 of Embodiment 1.

The relay unit 305 is a portion that serves as a path for a current to flow between the first power storage unit 91 and the second power storage unit 92 when at least switch unit 14 is in the ON state. A serial structural portion 10 provided in the relay unit 305 has the same configuration as the serial structural portion 10 of Embodiment 1, and includes the resistance unit 12 and the switch unit 14 that are connected in series to each other between the first conductive path 51 and the second conductive path 52.

The relay unit 305 is provided with a parallel conductive path 340 connected in parallel to the serial structural portion 10, and a second switch unit 342 configured to switch the parallel conductive path 340 between the conductive state and the non-conductive state. The second switch unit 342 may be the same switching means as the switch unit 14 for example, or a switching means whose pressure resistance and size are larger than those of the switch unit 14. The second switch unit 342 is configured to short the path between both ends of the serial structural portion 10 during the ON state, but not to cause a current to flow through the parallel conductive path 340 during the OFF state. The relay unit 305 has a configuration in which the amount of current flowing through the parallel conductive path 340 when the second switch unit 342 is in the ON state (including cases where the switch unit 14 is in the ON state and where the switch unit 14 is in the OFF state) is larger than the amount of current flowing through the serial structural portion 10 when the switch unit 14 is in the ON state and the second switch unit 342 is in the OFF state.

Here, control in a normal state will be described. In the relay device 302, the control unit 3 turns the switch unit 14 and the second switch unit 342 on/off. If a predetermined first condition is met, the control unit 3 turns on only the switch unit 14 and not the second switch unit 342. For example, the control unit 3 may be configured to continuously monitor voltages output from the second power storage unit 92, and turn on only the switch unit 14 if the voltage output from the second power storage unit 92 is less than a predetermined second threshold (charge start threshold) and is equal to or greater than a third threshold (quick charge start threshold). Specific examples include a case where the second switch unit 342 is maintained in the OFF state and only the switch unit 14 is turned on if the voltage output from the second power storage unit 92 has reached a predetermined first threshold (full charge threshold), and then has decreased to a value lower than the predetermined second threshold (charge start threshold), and a charge current is caused to flow through the serial structural portion 10 based on the power of the and generator 95 or the first power storage unit 91 to charge the second power storage unit 92. According to this example, when the second power storage unit 92 has been fully charged, and then the voltage output from the second power storage unit 92 has decreased to a value lower than the predetermined second threshold (charge start threshold) due to driving of an electrical load for example, it is possible to perform recharging with a relatively small charge current. Note that this case is merely an example, and the timing at which the control unit 3 turns on only the switch unit 14 (timing at which the first condition is met) is not particularly limited, and the number of conditions is also not limited to one.

If the predetermined second condition is met, the control unit 3 turns on the second switch unit 342. For example, the control unit 3 may also perform control such that the second switch unit 342 is turned on if the voltage output from the second power storage unit 92 is less than the above-described third threshold (quick charge start threshold) and is larger than a later-described abnormality threshold. Specific examples include a case where, if the voltage output from the second power storage unit 92 is less than the third threshold (quick charge start threshold) and is larger than the abnormality threshold during a particular period such as a period immediately after the ignition switch of the vehicle has been switched from the OFF state to the ON state, the control unit 3 may turn on the second switch unit 342, and a charge current is caused to flow through the parallel conductive path 340 based on the power of the generator 95 or the first power storage unit 91 so that the second power storage unit 92 is quickly charged. According to this example, when the voltage output from the second power storage unit 92 has decreased largely by a certain degree during the particular period, it is possible to perform recharging with a relatively large charge current. Note that this case is merely an example, and the timing at which the control unit 3 turns on the second switch unit 342 (timing at which the second condition is met) is not particularly limited, and the number of conditions is also not limited to one. Furthermore, only the second switch unit 342 may be turned on, or both of the switch unit 14 and the second switch unit 342 may be turned on.

Furthermore, if the predetermined condition is met, the control unit 3 turns off the switch unit 14 and the second switch unit 342. The conditions under which the control unit 3 turns off the switch unit 14 and the second switch unit 342 are not particularly limited, and the number of conditions is also not limited to one. For example, the control unit 3 may also be configured to turn off both of the switch unit 14 and the second switch unit 342 if the voltage output from the second power storage unit 92 has reached the predetermined first threshold (full charge threshold) (that is, if the second power storage unit 92 is fully charged). Alternatively, the control unit 3 may also be configured to turn off the switch unit 14 and the second switch unit 342 if the power supply device 301 is in the predetermined abnormal state. Of course, the switch unit 14 and the second switch unit 342 may also be turned off at another timing.

The following will describe an operation of the relay device 302 when an abnormality has occurred. If a predetermined abnormal state has occurred, the control unit 3 forcibly turns off the switch unit 14 and the second switch unit 342 provided in the relay unit 5. For example, the control unit 3 continuously monitors detected values (voltage values) input from a first voltage detection unit 21 and a second voltage detection unit 22, which correspond to an example of the detection unit, and turns off both of the switch unit 14 and the second switch unit 342 if the detected value input from at least either of the first voltage detection unit 21 and the second voltage detection unit 22 is the predetermined abnormality threshold Vth or less. Note that the value of the abnormality threshold Vth is not particularly limited, but can be set to, for example, a value lower than the above-described second and third thresholds.

Note that, also in this example, a first current detection unit 31 may function as a detection unit, and in this case, the control unit 3 turns off both the switch unit 14 and the second switch unit 342 if the value (current value) detected by the first current detection unit 31 is within the predetermined abnormal range (within a range above the abnormality threshold Ith) when at least either of the switch unit 14 and the second switch unit 342 is in the ON state.

As described above, the relay device 302 and the power supply device 301 using it are provided with the parallel conductive path 340 connected in parallel to the serial structural portion 10, and the second switch unit 342 configured to switch the parallel conductive path 340 between the conductive state and the non-conductive state, and have a configuration in which the amount of current flowing through the parallel conductive path 340 when the second switch unit 342 is in the ON state is larger than the amount of current flowing through the serial structural portion 10 when the switch unit 14 is in the ON state and the second switch unit 342 is in the OFF state.

In this configuration, it is possible to perform charging with a relatively small amount of current if the second switch unit 342 is in the OFF state and the switch unit 14 is in the ON state. If, in this case, an earth fault has occurred in either power storage unit side, a voltage reduction on the other power storage unit side can be suppressed, and thus it is possible to place priority on an effect of suppressing a voltage reduction in case of occurrence of an earth fault. In other words, under these circumstances, the same effects as in Embodiment 1 can be achieved.

On the other hand, if the second switch unit 342 is in the ON state and the switch unit 14 is in the OFF state, it is possible to perform charging with a relatively large amount of current, making an operation in which priority is placed on the charging speed possible. Particularly in this configuration, since it is possible to cause a relatively small current to flow through the switch unit 14 and a relatively large current to flow through the second switch unit 342, the switch unit 14 is required to have characteristics less strict than the second switch unit 342. Accordingly, it is easy to achieve size and cost reduction of the switch unit 14.

Other Embodiments

The present description is not limited to the embodiments described with reference to the description above and the drawings, and the technical scope of the present description encompasses, for example, the following embodiments.

(1) Although, in the above-described examples, actuators (for example, motorized power steering systems) that require redundancy are exemplified as the first electrical load 81 and the second electrical load 82, the present description is not limited to this in any of the embodiments. For example, a configuration is also possible in which the first electrical load 81 is configured as a sensing device such as a radar, ultrasonic sensor or a camera, and the second electrical load 82 is configured as a sensing device for backup that has the same function as this. Furthermore, the load connected to the first power storage unit 91 side, and the load connected to the second power storage unit 92 may have different functions.

(2) Although the above-described example includes only one serial structural portion 10 in which the resistance unit 12 and the switch unit 14 are connected in series to each other, a plurality of serial structural portions 10 may also be provided in parallel to each other between the first conductive path 51 and the second conductive path 52 in any of the embodiments.

(3) Although, in the above-described example, the switch unit 14 is made of two MOSFETs, the switch unit 14 may also be made of semiconductor switches other than the MOSFETs or mechanical relays in any of the embodiments.

(4) Although, in the above-described example, the first voltage detection unit 21, the second voltage detection unit 22, and the first current detection unit 31 are provided as the detection unit, any one or some of detection units may also be omitted. Furthermore, a current detection unit may also be provided on the second conductive path side.

LIST OF REFERENCE NUMERALS 1, 201, 301 On-board power supply device
2, 202, 302 Relay device
3 Control unit
5, 205, 305 Relay unit
10 Serial structural portion
12 Resistance unit
14 Switch unit
21 First voltage detection unit (detection unit)
22 Second voltage detection unit (detection unit)
31 First current detection unit (detection unit)
51 First conductive path
52 Second conductive path
91 First power storage unit
92 Second power storage unit
240, 340 Parallel conductive path
242, 342 Second switch unit

The invention claimed is:

1. A relay device comprising:

a relay unit that is provided with a switch unit disposed between a first power storage unit and a second power storage unit and in which the switch unit is switched between an ON state in which a current is allowed to flow between the first power storage unit and the second power storage unit, and an OFF state in which no current is allowed to flow; and a control unit configured to turn the switch unit on/off, the relay device further comprising:

a first conductive path electrically connected to the first power storage unit, a first electrical load, and a generator;

a second conductive path electrically connected to the second power storage unit and a second electrical load;

a first voltage detection unit configured to detect a voltage of the first conductive path; and a second voltage detection unit configured to detect a voltage of the second conductive path, wherein the second electrical load is a load capable of executing a function of the first electrical load if the first electrical load malfunctions, the relay unit has a configuration in which a resistance unit and the switch unit are connected in series to each other between the first conductive path and the second conductive path, and is provided with: a parallel conductive path connected in parallel to the resistance unit; and a second switch unit configured to switch the parallel conductive path between a conductive state and a non-conductive state, the relay unit having a configuration in which, when the switch unit and the second switch unit are both in the ON state, an amount of current flowing through the parallel conductive path is larger than an amount of current flowing through the resistance unit, and the control unit is configured to turn the switch unit and the second switch unit off if a voltage value detected by at least either of the first voltage detection unit and the second voltage detection unit is equal to or smaller than a predetermined abnormality threshold, the control unit is configured to turn the switch unit on and the second switch unit off if a value of the voltage of the second conductive path is equal to or greater than a quick charge start threshold, which is larger than the abnormality threshold, and the control unit is configured to turn the switch unit and the second switch unit on if a value of the voltage of the second conductive path is smaller than the quick charge start threshold and is greater than the abnormality threshold.

2. A relay device comprising:

a relay unit that is provided with a switch unit disposed between a first power storage unit and a second power storage unit and in which the switch unit is switched between an ON state in which a current is allowed to flow between the first power storage unit and the second power storage unit, and an OFF state in which no current is allowed to flow; and a control unit configured to turn the switch unit on/off, the relay device further comprising:

a first conductive path electrically connected to the first power storage unit, a first electrical load, and a generator;

a second conductive path electrically connected to the second power storage unit and a second electrical load;

a first voltage detection unit configured to detect a voltage of the first conductive path; and a second voltage detection unit configured to detect a voltage of the second conductive path, wherein the second electrical load is a load capable of executing a function of the first electrical load if the first electrical load malfunctions, the relay unit is provided with: a serial structural portion in which a resistance unit and the switch unit are connected in series to each other between the first conductive path and the second conductive path; a parallel conductive path connected in parallel to the serial structural portion; and a second switch unit configured to switch the parallel conductive path between a conductive state and a non-conductive state, the relay unit having a configuration in which an amount of current flowing through the parallel conductive path when the second switch unit is in the ON state is larger than an amount of current flowing through the serial structural portion when the switch unit is in the ON state and the second switch unit is in the OFF state, and the control unit is configured to turn the switch unit and the second switch unit off if a voltage value detected by at least either of the first voltage detection unit and the second voltage detection unit is equal to or smaller than a predetermined abnormality threshold, the control unit is configured to turn the switch unit on and the second switch unit off if a value of the voltage of the second conductive path is equal to or greater than a quick charge start threshold, which is larger than the abnormality threshold, and the control unit is configured to turn the switch unit and the second switch unit on if a value of the voltage of the second conductive path is smaller than the quick charge start threshold and is greater than the abnormality threshold.

3. A power supply device comprising:

the relay device according to claim 1; and the second power storage unit electrically connected to one end of the relay device.

* * * * *